United States Patent [19]

Peterson

[11] Patent Number: 5,568,756
[45] Date of Patent: Oct. 29, 1996

[54] SUPPORT MEANS FOR A SAW MACHINE

[76] Inventor: Carl J. Peterson, Twist Road, Ngakura, New Zealand

[21] Appl. No.: 297,638

[22] Filed: Aug. 29, 1994

[30] Foreign Application Priority Data

Aug. 31, 1993 [NZ] New Zealand .......................... 248548
Feb. 25, 1994 [NZ] New Zealand .......................... 250983

[51] Int. Cl.⁶ ........................................ B27B 7/00
[52] U.S. Cl. ................. 83/471.2; 83/485; 83/859
[58] Field of Search .................... 83/471.3, 485, 83/487, 471.2, 483, 486, 489, 928, 59

[56] References Cited

U.S. PATENT DOCUMENTS

| 855,301 | 5/1907 | Gobie | 83/485 |
|---|---|---|---|
| 1,528,536 | 3/1925 | DeWalt | 83/486 |
| 2,691,392 | 10/1954 | Jacobs et al. | 83/928 |
| 2,800,932 | 7/1957 | Scott | 83/485 |
| 3,504,715 | 4/1970 | Miles | 83/489 |
| 4,235,140 | 11/1980 | Reece . | |
| 4,794,964 | 1/1989 | Wolf | 83/485 |

FOREIGN PATENT DOCUMENTS

| 178434 | 6/1978 | New Zealand . |
|---|---|---|
| 195543 | 11/1980 | New Zealand . |
| 185435 | 12/1982 | New Zealand . |
| 207088 | 2/1984 | New Zealand . |
| 217710 | 9/1987 | New Zealand . |
| 230762 | 10/1991 | New Zealand . |

Primary Examiner—Kenneth E. Peterson
Attorney, Agent, or Firm—Kane, Dalsimer, Sullivan, Kurucz, Levy, Eisele and Richard, LLP

[57] ABSTRACT

This invention relates to a support. The support is particularly useful for a portable saw mill can comprise a lower track 1, an upper track 2, and a carriage 3. The carriage 3 supports a saw carriage 7 and moves along the tracks 1 and 2 to enable a log 8 to be milled. The saw carriage 7 can move up and down and side to side to enable correct cutting alignment with respect to the log 8.

8 Claims, 6 Drawing Sheets

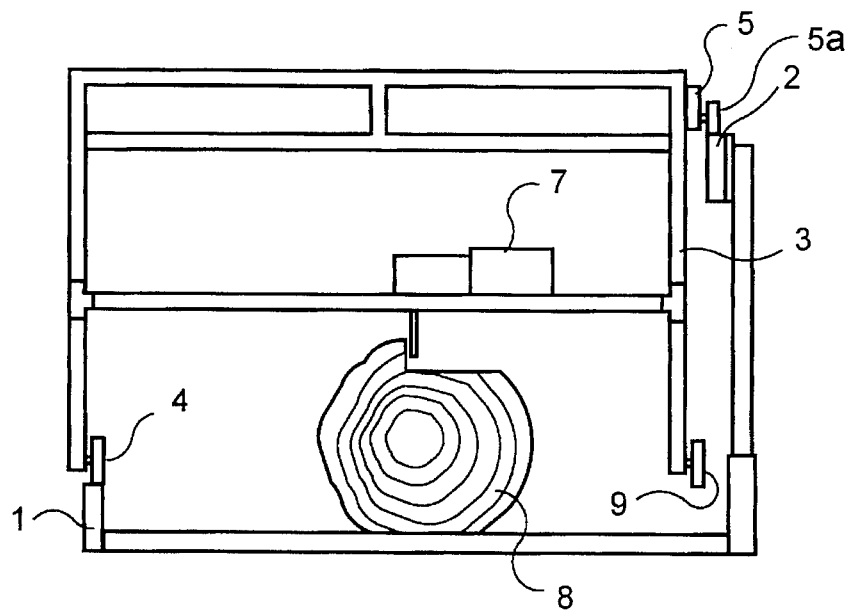
F I G. 2
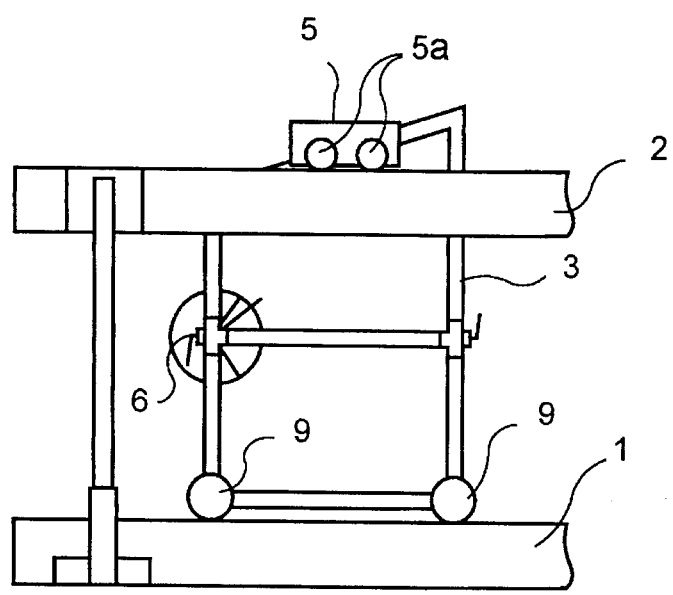
F I G. 3

SUPPORT MEANS FOR A SAW MACHINE

The present invention relates to a support means for a saw machine and in particular for support saw machine.

The saw machine comprises a frame which supports a carriage for longitudinal movement along substantially parallel tracks. The carriage supports a saw carrier for vertical movement relative to the frame and for transverse movement across the frame. The carriage is also adapted to allow movement of the saw between a first position, in which the saw blade is positioned for a horizontal cut, and a second position in which the blade is positioned for a vertical cut.

According to one aspect of the invention there is provided a support means comprising a carriage and two track elements, the support means being constructed such that the track elements can be arranged in spaced relationship such that each track element contacts an opposite side of the carriage, the carriage being moveable along the track elements while the track elements provide support to the carriage wherein at least one of the track elements is in a substantially elevated or overhead position, the carriage being suitable for supporting cutting means such that the cutting means can be moved along the track elements by way of the carriage.

In one embodiment of the invention there is provided a support means which is in accordance with the immediately preceding paragraph constructed such that when it is in use both of the track elements can function to support the carriage while one of the track elements is on or immediately adjacent a ground surface.

In a further embodiment of the invention there is provided a support means which is in accordance with the second immediately preceding paragraph constructed such that when it is use both of the track elements can function to support the carriage while both track elements are positioned in a substantially elevated or over-head position.

Preferably the carriage has wheels or rollers which can roll along the track elements.

In some embodiments of the invention the carriage may include an additional wheel or wheels which directly contact a ground surface.

Many features of the saw machine are similar to those of the saw machine that is described in the specification for UK Patent Application No 2212101A, and the full disclosure of that specification is incorporated herein by reference.

By elevating one of the track elements problems that have been experienced in connection with the build up of sawdust around the track, which can cause wheel failure and demand regular removal, can be avoided. Specifically, because of the direction of rotation of the saw blade, sawdust tends to accumulate to one side of the sawing machine and the track on that side of the machine is elevated.

The support means also provides a significant advantage in that heavy logs may be rolled into a cutting position within the support means below the elevated track element and thus damage is avoided.

A removable frame element, for example an H frame, may be positionable beneath the elevated track element in order to provide further support, for example for particularly long cuts. A raising/lowering mechanism incorporating a chain, such as shown in the accompanying drawings, may also be incorporated. Such raising/lowering mechanism may include a variable height adjuster.

The saw carrier may be raised and lowered within the carriage ring a raising wheel that cooperates with a keyed shaft. Desirably, clamping means are arranged so that the saw carrier can be raised and lowered from one end.

Further and fuller details of one particularly preferred form of the invention can be seen from the accompanying drawings.

Although wheels and rollers have been mentioned specifically, any suitable arrangement permitting movement of the carriage relative to the frame elements of the track and, separately, the saw carrier relative to the carriage, may be employed.

In the Drawings:

FIG. 2 is a front elevation of the saw machine of FIG. 1;

FIG. 3 is a side elevation of the saw machine of FIG.1;

Figure 5:
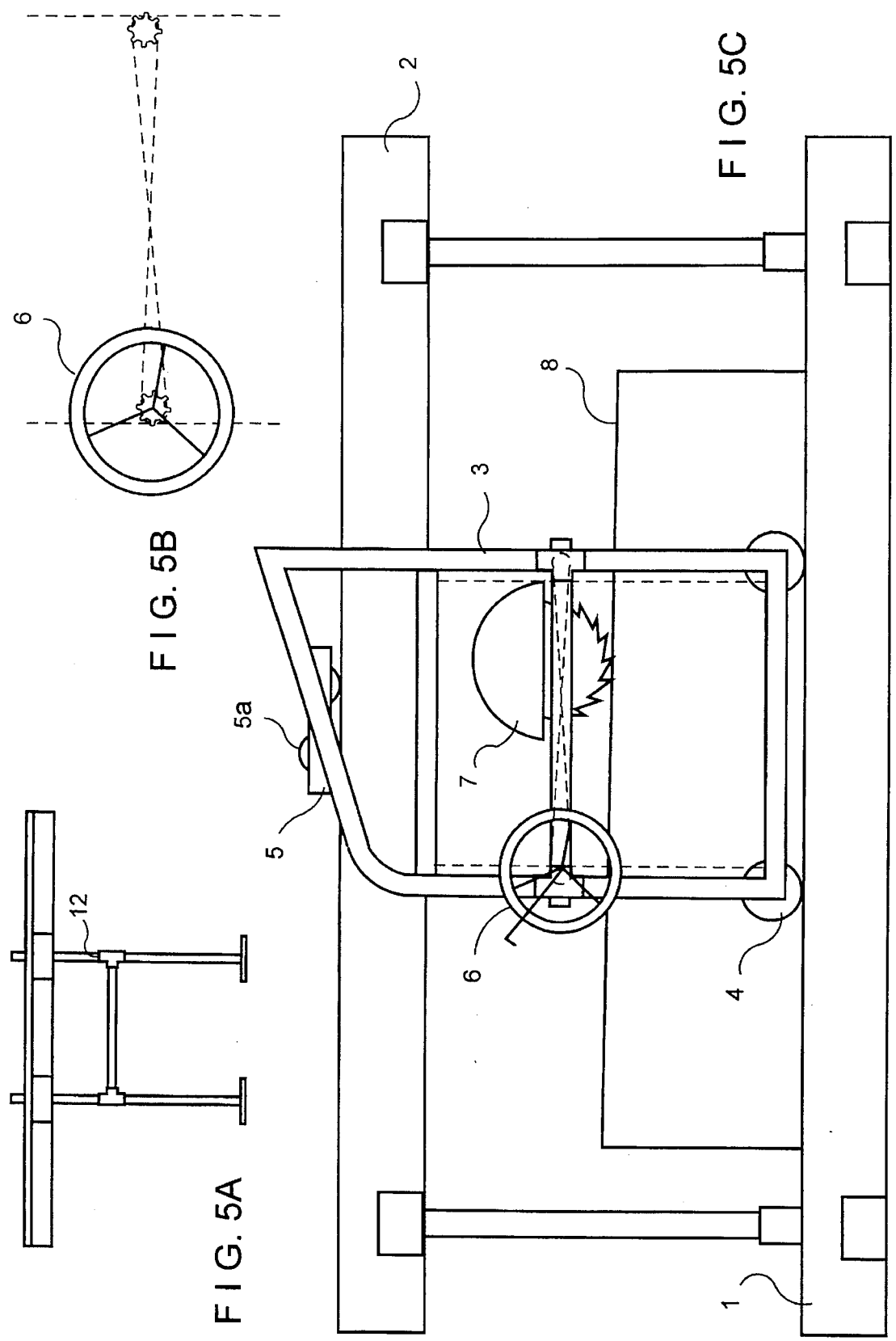
Figure 6:
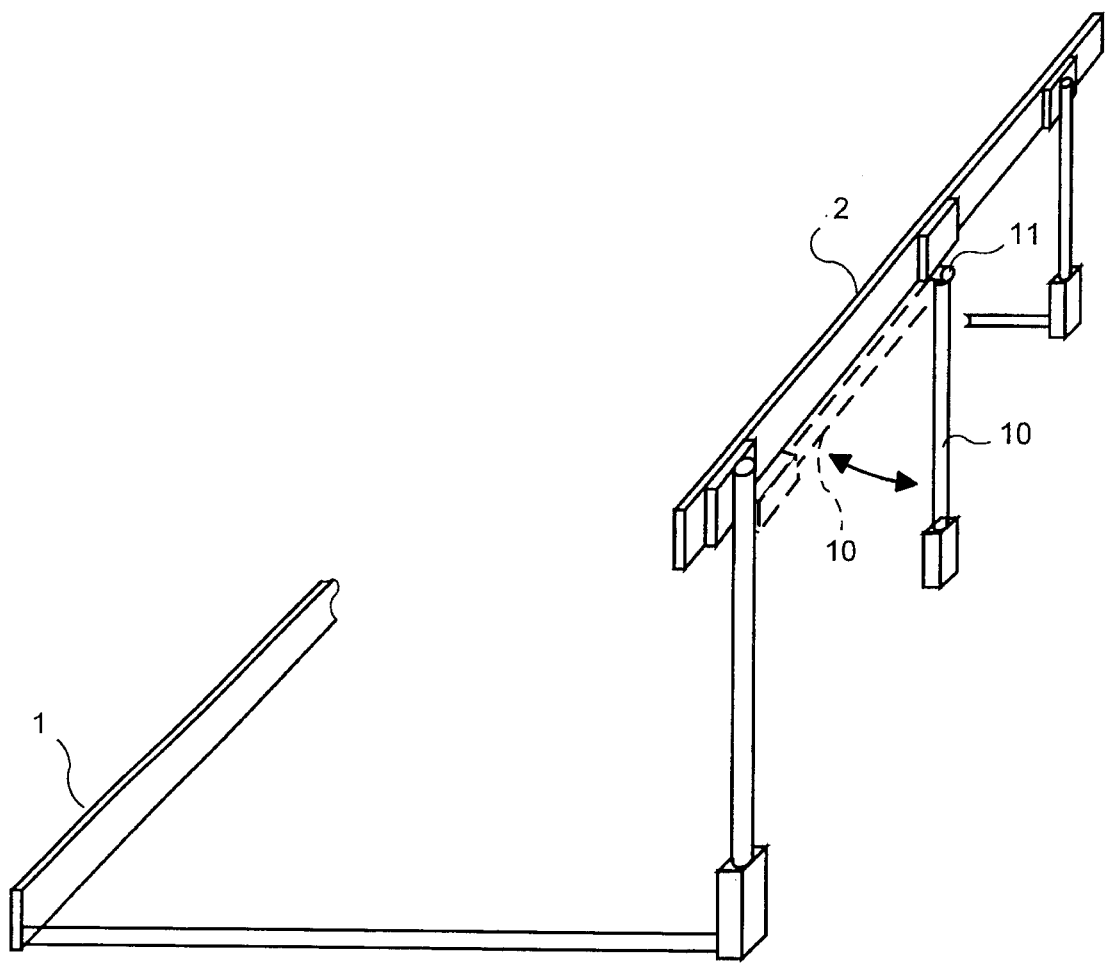
Figure 7:
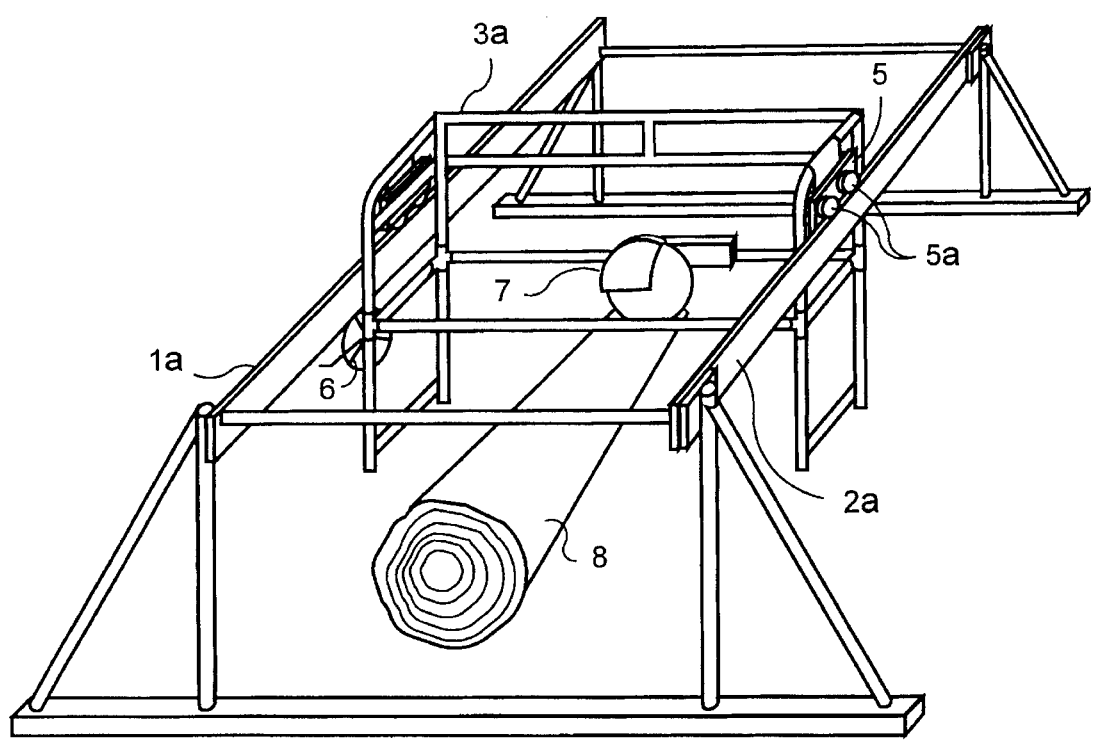

FIG. 5a is a side elevation at reduced scale of part of an alternative to FIG. 3; FIG. 5b shows the adjustment means; FIG. 5c is another side elevation at a larger scale than FIG. 3; and FIG. 6 and 7 illustrates, schematically, further alternative arrangements.

The saw machine may be made from any suitable material. Lightweight materials are preferred to facilitate portability. The machine may be constructed in any desired dimensions. Preferred arrangements of the machine are portable and may quickly be assembled in a location for use. The use of a circular saw blade in combination with a chain saw motor serves to increase the adaptability and portability of machines of the invention. As shown in the drawings, the frame elements conveniently interlock to provide a rigid and robust saw machine.

With reference to FIGS. 1–5, there is shown a portable saw mill comprising a lower track 1, an upper track 2 and a carriage 3. The carriage 3 has wheels 4 which run along the lower track 1. The carriage 3 also has a donkey wheel arrangement 5 which enables the carriage to run along the upper track 2. Preferably the donkey wheel arrangement 5 enables a three point weight distribution with two wheels 5a to reduce wear. In alternative embodiments of the invention the donkey wheel arrangement may only have one wheel.

Figure 4:
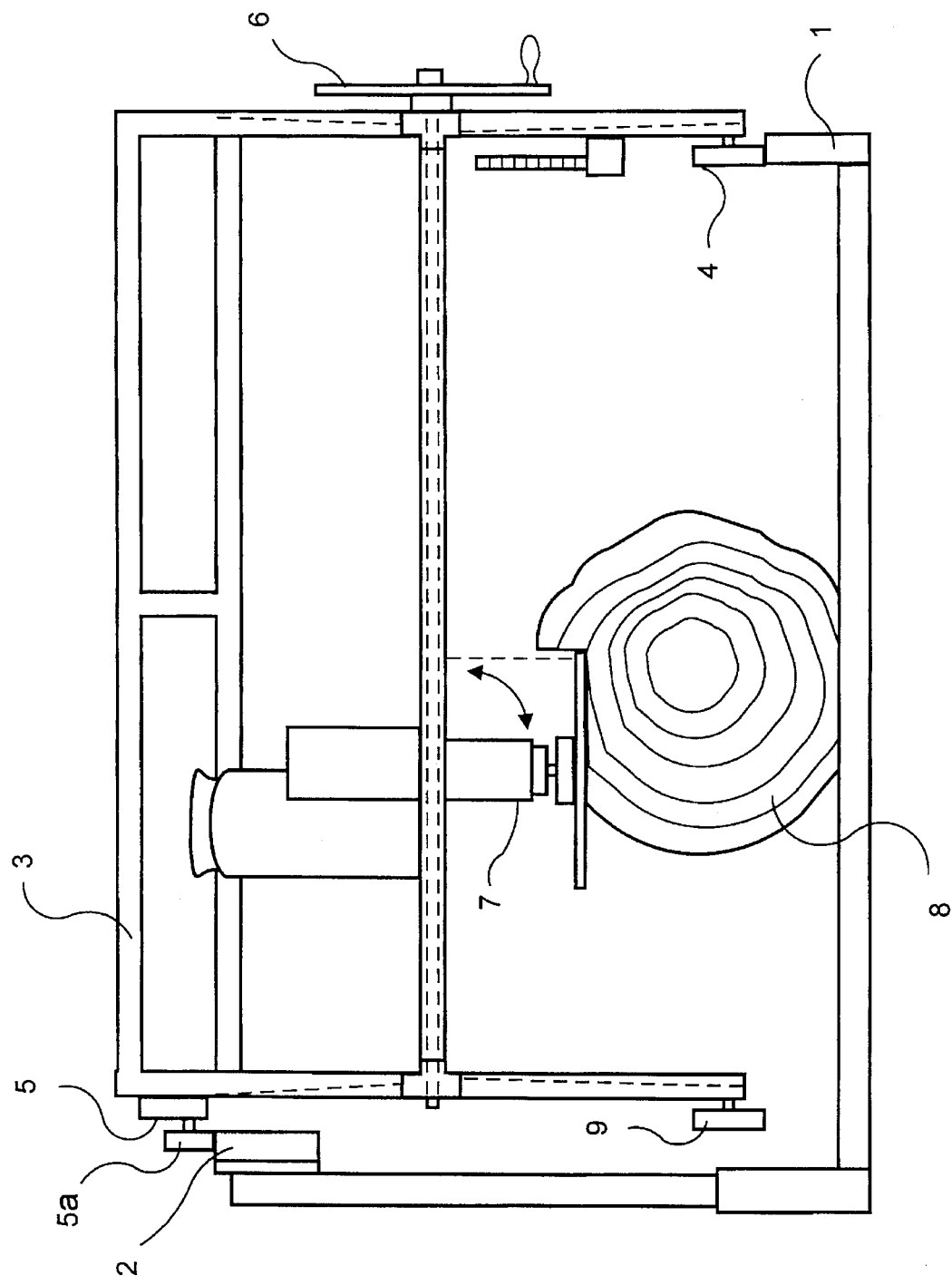
FIG. 4 is an enlarged elevation of the other side of the saw machine of FIG. 1.

The carriage has adjustment means 6 which enables a saw carriage 7 to be moved up, down, and side to side with respect to an underlying log 8. With reference to FIG. 4 and 5, the adjustment means comprises a chain arrangement for controlling the movement of the saw carriage 7.

Figure 1:
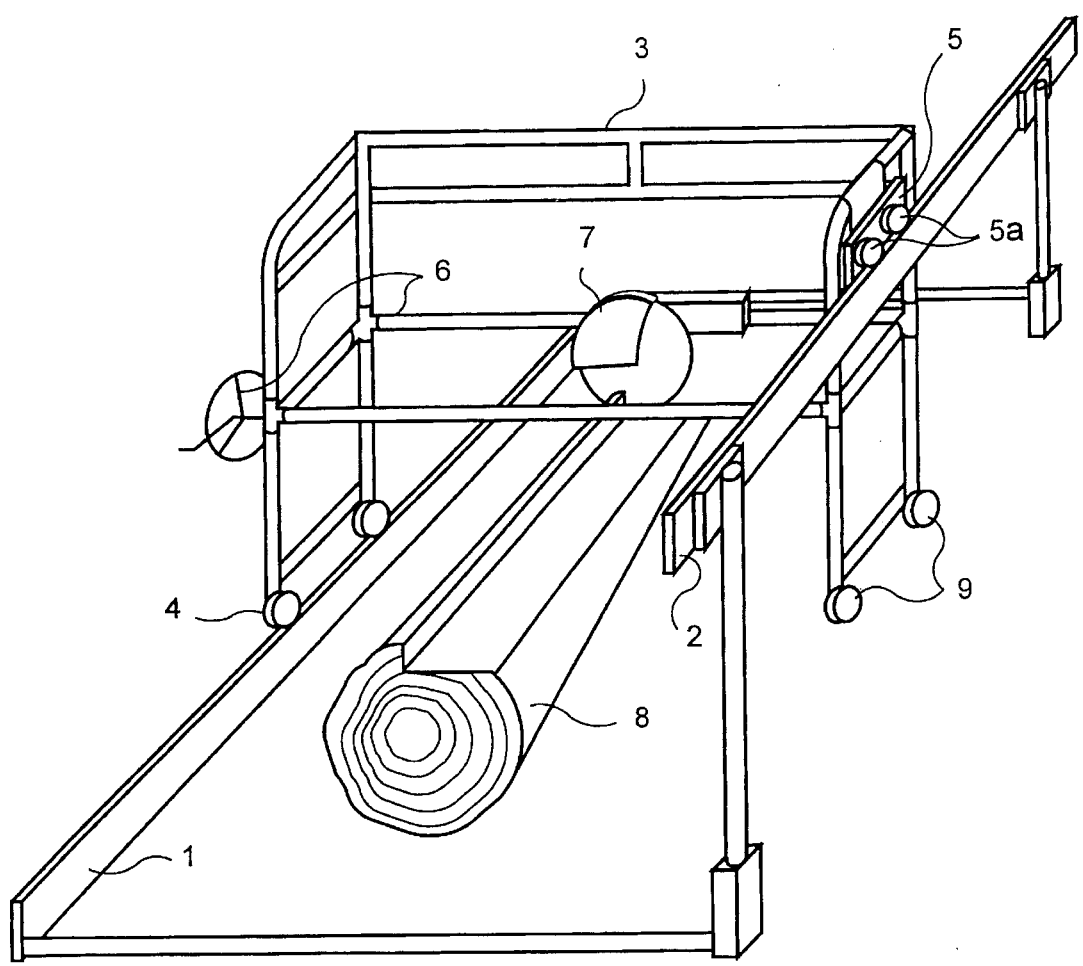
FIG. 1 is a perspective view of a saw machine in accordance with the present invention.

As shown in FIG. 1, the carriage has ground wheels 9 to assist in bearing the weight of the carriage.

With reference to FIG. 7, there is shown an alternative embodiment of the invention wherein both tracks 1a and 2a are in an elevated position to support the carriage 3a. In this embodiment there is no lower track.

To assist in supporting the upper tracks 1a, 2 or 2a the saw mill may, as shown at FIG. 6, incorporate a central frame element 10. The frame element 10 can pivot about an attachment point 11 where it contacts the upper track concerned. Those skilled in the art will appreciate that pivoting the frame element to a position substantially parallel with the associated upper track enables a log to be rolled into position beneath the saw carriage 7.

The following is a list of features which can form part of the invention.
1. Upright posts may suitably be situated at the track ends;
2. The upper track(s) may be bolted or otherwise secured to be attached to an upright element to prevent undesirable sliding or other movement;
3. The illustrated donkey wheels may be replaced with single wheels at each corner to provide stability;

4. At least one of the donkey wheels may be vertically adjustable to enable even weight distribution;
5. An easy adjustment bolt may be added to enable adjustment of weight distribution;
6. The top of the track elements may be rectangular to allow the easy mounting of wheels.
7. The H-shaped upper track support 12 can be discarded and the upper track can be secured by track supports in appropriate positions for maximum support and easy removal;
8. Lower, horizontal, track holders may be staked to the ground or otherwise supported, to anchor the saw machine in position for use, and stake holes, or the like, may be provided to facilitate this;
9. At the position of the upright pole holder, a pipe clamp may be attached to permit a supplementary shorter log to be inserted, for example, for use on uneven ground;
10. For use of the frame in a more permanent location, the lower tracking may be firmly located on a solid bed part and the higher track(s) attached to an overhead support, such as a beam or rafter. This will allow access from the upper track side for loading logs and removing sawn timber and saw dust that accumulates during use. Conveniently the fixed tracks are removed to permit portable use;
11. Both tracks may be fixed in elevated positions, one supported with rigid trusses, with all of four sets of carriage wheels mounted at the center of the carriage. This arrangement is particularly suited to the use of mechanical motive power to move the carriage forwards and rearwards. Desirably both elevated tracks are firmly attached to overhead rafters or beams in a fixed location. Electric or hydraulic motors may be used to move the carriage, which support the cutting saw or saws. FIG. 7 illustrates one possible arrangement.

While some preferred features and embodiments of the invention have been described by way of example it should be appreciated that improvements and modifications can occur without departing from the scope of the appended claims.

What we claim is:

1. A saw support means having a carriage and first and second track elements, the carriage having first and second bearing elements spaced apart along a length of the carriage, the first bearing element bears upon, and travels along the first track element, the second bearing element bears upon, and travels along the second track element, the carriage including saw attachment means affixed thereto for holding a saw at a location between the spaced bearing elements, the carriage further including adjustment means by which the saw attachment means may be moved up and down and side to side relative to the carriage, the first track being on or immediately adjacent the ground, the second track element being erected in an elevated position vertically higher than the saw, whereby a log could be rolled underneath the second track element and into a position to be cut by the saw.

2. A saw support means according to claim 1, in which the bearing elements include wheels to facilitate movement of the carriage along the tracks.

3. A saw support means according to claim 2, in which the adjustment means includes a chain by which the position of the saw attachment means on the carriage can be adjusted.

4. A saw support means according to claim 3 in which the carriage includes at least one ground wheel adapted to directly contact and run along a surface of the ground.

5. A saw support means according to claim 4 including an elongate support element pivoted to said elevated second track element at a position between a first end and a second end thereof, the support element being moveable through an angle of substantially 90° so as to be substantially parallel with the second track element to which it is pivoted and which it can be used to support.

6. A saw support means according to claim 5 in which both of the track elements are positioned in a substantially elevated or overhead position.

7. A saw support means according to claim 6 in which the saw attachment means is moveable between a first position and a second position, such that a saw carried by the saw attachment means can produce a horizontal cut when the saw attachment means is in the first position and a vertical cut when in the second position.

8. A saw support means according to claim 7 including a saw and a motor to drive the saw, the saw being carried by the saw attachment means.

* * * * *